United States Patent Office 2,861,980
Patented Nov. 25, 1958

2,861,980
METHOD FOR PRODUCING UREA FORMALDEHYDE CORE BINDER RESINS

Robert L. Fischer, Pennsauken, N. J., assignor to Cities Service Research and Development Company, New York, N. Y., a corporation of New Jersey No Drawing. Application October 5, 1955
Serial No. 538,791

4 Claims. (Cl. 260—71)

This invention relates to improvements in urea formaldehyde resin compositions, and more particularly relates to the production of a clear urea formaldehyde core binder resin having increased tensile strength and prolonged shelf life.

For many years, foundry techniques utilized core oils to bind together the sand grains utilized in forming the casting molds. More recently, interest has been focused on new and improved resinous binding compositions which will provide the requisite tensile strength and molding characteristics for the sand cores used. The amount of binding material used in the mold formation will vary, depending on the type of mold desired. In the conventional shell molding process, for example, a comparatively small amount, approximately 1–10 percent by weight, of a thermo-setting resin is used as a binding agent for the sand or silica during formation of the core. The core or mold obtained with such a resin is normally very thin, highly permeable, and must possess high tensile strength.

In carrying out the mold preparation, the mixture of sand and binding agent is spread lightly in a heated model pattern. On contact with the heated pattern, the resin present in the sand mixture takes on the physical shape of the pattern. In a short period of time, depending on the particular resin binder utilized and the temperature at which the pattern is maintained, a mold will have built up on the pattern. Excess sand and resin not formed in the mold can then be removed.

To provide the binding effect in the temperature ranges normally required in foundry practice, several types of resins have been used, including the urea formaldehyde resins with which this invention is particularly concerned. The majority of the core binding resin compositions presently used consists of formaldehyde with such compounds as phenol, melamine, resorcinol, and various aromatic amines.

Of the foregoing resins, one of the most widely used is the urea formaldehyde resins. The urea formaldehyde resins are thermosetting without air, cure very rapidly, are easily baked by induction heating in a short period of time, easily shaken from the pattern, and are generally more resistant to metal penetration than are conventional core oils.

I have found that presently available urea formaldehyde core binding compositions have an undesirable milky or cloudy appearance which detracts from their sales appeal. More importantly, however, commercially available urea formaldehyde core binder resins are of low tensile strength and undesirably short shelf life.

I have now discovered a method of preparing a urea formaldehyde core binding resin which will produce a substantially clear resin having improved tensile strength, greater oxidation stability, and increased shelf life over presently available cloudy urea formaldehyde core binder resins. In order to obtain these improved clear urea formaldehyde condensation products, I have found that it is necessary to carry out the urea formaldehyde condensation reaction with precise quantities of reactants under carefully controlled reaction conditions.

The cores produced with resins prepared according to my invention provide molds having dimensional tolerances and details well within the defined limits required in foundry molding processes. Moreover, cores produced with the binding resins of my invention have a permeability sufficiently high to avoid back pressures which sometimes occur with molds of low permeability prepared with presently available core binding resins.

I have found that the improved, clear urea formaldehyde core binding resin of my invention can best be obtained by carrying out the urea formaldehyde condensation reaction as hereinafter described. According to the process of my invention, 1 mol of urea is reacted with 2.2 mols of 37 percent formaldehyde in the presence of from 0.09 to 0.1 mol of ammonia under carefully controlled reaction conditions. The reaction conditions which I have found critical to the obtaining of the desired reaction product are the careful adjustment of pH and a fixed period of reflux of the reaction mixture once the reactants have been brought to reaction temperature. In preparing urea formaldehyde condensation products with the specific molar quantities set forth above, I have found that the pH of the reaction mixture should be adjusted to a value of about 8.7 to 9.2 while the reactants are brought to a temperature of about 200–220° F. After the reaction mixture has been brought to a temperature of from about 200–220° F., the mixture is slowly refluxed at that temperature for a period of from 17 to 19 minutes.

The avoidance of a cloudy or milky urea formaldehyde condensation product suitable as a core binder resin that will provide the maximum tensile strength and shelf life can only be obtained by adhering to the specific conditions described. I have found that urea formaldehyde core binder resins obtained by condensation reactions conducted outside the conditions set forth often result in products having suitable, clear characteristics but lacking in the desired shelf life or tensile strength or both.

The reasons for obtaining a more effective core binder resin according with the reactant quantities and conditions outlined above are not clear. It is believed that the condensation reaction of the urea and formaldehyde normally proceeds in three stages. In the first stage of the reaction, a product is obtained which is water-soluble and substantially clear. If the reaction is allowed to proceed, however, past the point where the reaction product is water-soluble, an undesirable gelatinized condensation product which is insoluble in water is obtained. This product is of no value as a core binder in preparing molds. Permitting the reaction to proceed further, as for example, by prolonged heating for a period longer than the 17–19 minutes of reflux, results in a solid polymerized product which is completely unworkable and of no value as a core binder. Since neither the second nor third stage reaction products provide the desired core characteristics, it is essential that the condensation reaction proceed no further than stage one in which a clear, water-soluble condensation product is obtained.

The following examples will serve to illustrate the process of preparing urea formaldehyde core binder resins described above:

EXAMPLE 1

To 53.6 pounds of 37 percent formaldehyde solution (.660 mol) 17.9 pounds solid urea (0.298 mol) were added. To this mixture, 1.8 pounds of 28 percent aqueous ammonia (.0296 mol) were added with mixing. The mixture was blended in a steel mixing tank and placed in an autoclave after the urea entered solution. Heat was applied to the mixture until a temperature of 210–212° F. was attained. The mixture, having a pH of 8.9, was maintained at this temperature under reflux for 17 minutes. At the end of the reflux period, the mixture was cooled; during cooling a vacuum was slowly applied until a temperature of about 130° F. and a vacuum of about 28 inches of mercury were obtained. Distillate was obtained during a period of 50–60 minutes at a temperature of about 130–135° F. and a vacuum of 26–29 inches mercury. The amount of distillate collected amounted to approximately 25 percent by weight of feed or 18.38 pounds. When an amount of distillate, approximately 25 percent by weight of the total charge, had been recovered, the vacuum was released, the reaction mixture was cooled substantially to atmospheric temperature, and a solution of sodium pyrophosphate (44.5 grams in 373 cc. of water) was added to neutralize the resin. Advantage was taken of the vacuum to draw the neutralizing solution (i. e. the sodium pyrophosphate) into the reaction vessel before it was released.

The clear resin product (52.81 pounds) had a pH of 7.5, contained 8.9 percent free formaldehyde, had a viscosity of 175 centipoise, and an accelerated shelf life of 7.5 days at 125° F.

To determine the tensile strength of the urea formaldehyde resin obtained according to Example 1 above, test briquettes were prepared having the following composition:

| Ingredients | Weight, g. | Percent Weight |
|---|---|---|
| AFS[1] 50-70 Testing Sand | 2,200 | |
| Cereal Binder (Mogul Cereal Binder #186) | 22.0 | 1.0 |
| Resin | 22.0 | 1.0 |
| Water | 66.0 | 3.0 |
| Lubricant (kerosene) | 11.0 | 0.5 |

[1] American Foundrymen's Society.

The formulation was prepared in the following manner: First the sand was mixed with the cereal binder for one minute. One-half of the total water was then added and mixed with the sand and cereal for an additional minute. To this mixture, the resin, lubricant and remaining water were added and mixed for three minutes, a total five minute mixing cycle. Test briquettes of the foregoing formulation (approximately 105 grams each) were shaped in briquette boxes from which they were removed after shaping and inserted into a baking oven (Dietert #606, test core oven) preheated to a temperature of 390° F. The actual baking temperature of the test briquette was 350° F. After a sufficient number of test briquettes were prepared and baked, five test briquettes were removed after 15 minutes of baking, and every 15 minutes thereafter five additional briquettes were removed throughout a period of 120 minutes.

The briquettes were cooled to room temperature after removal from the oven and tensile strength determinations made in pounds per square inch for each briquette in a Dietert C. P. universal sand testing machine. The tensile strength recorded in Table I which follows was the result of average tensile strength readings for each of the five briquettes removed at each baking interval.

Table I

[Baking temperature—350° F.]

| Baking time: | Tensile strength—p. s. i. |
|---|---|
| 15 minutes | 313 |
| 30 minutes | 306 |
| 45 minutes | 273 |
| 60 minutes | 258 |
| 75 minutes | 262 |
| 90 minutes | 262 |
| 105 minutes | 253 |
| 120 minutes | 274 |

EXAMPLE 2

To 51.5 pounds of 37 percent formaldehyde solution (.635 mol), 17.164 pounds of solid urea (0.286 mol) were added. To this mixture 1.71 pounds of 28 percent aqueous ammonia (.0281 mol) were added with mixing. The mixture, having a pH of 8.9, was blended in a steel mixing tank and placed in an autoclave after the urea entered solution. Heat was applied to the mixture until a temperature of about 210–212° F. was obtained. The mixture was maintained at this temperature under reflux conditions for 17 minutes. At the end of the reflux period, the mixture was cooled and vacuum slowly applied until a temperature of about 137° F. and a vacuum of about 27 inches of mercury were obtained. Distillate was obtained during a distillation period of 50–60 minutes at a temperature of about 130–137° F. and at a vacuum of 26–27 inches of mercury. Collected distillate (20.88 pounds) amount to 29 percent by weight of feed. On release of the vacuum, a solution of sodium pyrophosphate (decahydrate) (71.5 grams in 600 cc. of water) was added to neutralize the resin. The reaction product had a pH of 8.0. Of the reaction product, approximately 67.5 percent or 48.63 pounds was recovered as clear resin. The reaction product contained about 7.4 percent free formaldehyde. Maximum tensile strength determined according to the method described in Example 1 was 325 p. s. i. Shelf life was seven days at 125° F.

EXAMPLE 3

To 360 grams of 37 percent formaldehyde solution (4.45 mols) 120 grams of solid urea (2.0 mols) were added. To this mixture 12 grams of 28 percent aqueous ammonia (.197 mol) were added. The mixture, having a pH of 8.9, was brought to a temperature of 210° F. and refluxed for 17 minutes. The reaction mixture was cooled and vacuum distilled under 26–28 inches of mercury. Distillate collected was approximately 28 percent by weight of feed. On release of vacuum, the solution was cooled and adjusted to a pH of 7.8 with a solution of sodium pyrophosphate (.66 gram in 10 cc. of water). The clear resin product of 355 grams (70.5 percent) had a tensile strength of 323 p. s. i. and a shelf life of seven days at 125° F.

The importance of adhering to the defined operating conditions in carrying out preparation of urea formaldehyde resins to provide core binders of desired characteristics having superior tensile strength and shelf life will be apparent from Table II which follows:

Table II

| Run No. | Urea, Mole | CH₂O, Moles | NH₃, Moles | Reflux, min. | Max. T. S., p. s. i. | Shelf Life @ 125° F., days | Appearance |
|---|---|---|---|---|---|---|---|
| 1. B-10 | 1 | 2.22 | 0.0986 | 17 | 308 | 7.5 | Clear. |
| 2. R-132-54 | 1 | 2.00 | .0888 | 17 | 258 | 5.0 | Sl. haze. |
| 3. R-130-54 | 1 | 2.22 | .0986 | 14 | 278 | 5.5 | Milky. |
| 4. R-131-54 | 1 | 2.22 | .0986 | 14 | | 6.0 | Do. |
| 5. R-133-54 | 1 | 1.90 | .0844 | 17 | 264 | 5.5 | Do. |
| 6. B-6 | 1 | 2.22 | .0986 | 17 | 325 | 7.0 | Clear. |
| 7. R-115-54 | 1 | 2.22 | .0986 | 17 | 323 | 7.0 | Do. |
| 8. R-103-54 | 1 | 2.22 | .0986 | 17 | 329 | 6.5 | Do. |
| 9. R-105-54 | 1 | 2.22 | .0986 | 17 | 338 | 6.5 | Do. |
| 10. R-101-54 | 1 | 2.22 | .0986 | 17 | 330 | 6.0 | Do. |
| 11. R-102-54 | 1 | 2.22 | .0986 | 12 | 266 | 7.0 | Cloudy. |
| 12. R-99-55 | 1 | 2.22 | .0986 | 21 | 279 | 8.5 | Do. |
| 13. R-96-54 | 1 | 2.22 | .0986 | 21 | 275 | 7.0 | Do. |
| 14. R-97-54 | 1 | 2.22 | .0986 | 21 | 264 | 7.0 | Do. |
| 15. R-111-55 | 1 | 2.22 | .0986 | 45 | 251 | 2-3 | Clear. |

As previously described, it is essential that the molar quantities of reactants and the time during which the reaction mixture is refluxed at the reaction temperature be carefully controlled during the preparation of the resin to insure maximum tensile strength and shelf life, as well as the clear appearance. Reaction of the urea and formaldehyde in the molar quantities of 1 to 2.2 mols with ammonia being added in an amount from 0.09 to 0.1 mol with a reflux time of from about 17 to 19 minutes will provide a clear product having the best average of tensile strength and shelf life. It is also of importance that the reaction mixture have a pH of about 8.6 to 9.2 or slightly higher when reflux is begun. During the reaction, the pH decreases somewhat. Once reflux has been completed and the product separated, stabilization of the resin product to a pH of between 7.5 and 8.0 must also be accomplished.

Referring now to Table II, it will be seen that runs 1, 6, 7, 8, 9, and 10 were carried out, substantially within the range of reactant quantities as set forth and at the reflux time described. In all of these runs, 1–15, the pH of the reaction mixture was adjusted to a value of between 8.7 and 9.2 with the final resin product being stabilized at a pH of between 7.5 and 8.0. It will be noted that for these runs tensile strength of samples was greater than 300 p. s. i. with the shelf life varying from 6.0 to 7.5 days. In these runs, the product resin had the desirable clear appearance. In run 2, wherein the amount of formaldehyde and ammonia was slightly less than the required minimum amounts of these respective reactants, tensile strength dropped to 258 p. s. i. and shelf life was shortened by one day over shelf life of six days noted for the product of run 10, or two days for the product of runs 6, and 7. Moreover, the product of run 2 had an undesirably hazy appearance. In run 3, wherein the required molar ratio of reactants was adhered to, a reflux time of 14 minutes produced an inferior milky product having a tensile strength of 278 p. s. i. and a shelf life of 5.5 days. Similarly, run 4, carried out with the required molar quantities of reactants and refluxed for 14 minutes, provided a milky product having a shelf life of six days. In run 5, the quantities of formaldehyde and ammonia were reduced somewhat below the minimum quantities specified but the mixture was refluxed for the required time. The product had an undesirable milky appearance, a comparatively low tensile strength of 264 p. s. i., and an unsatisfactory shelf life of 5.5 days. In runs 11–15, variations were made in the reflux time, and in all cases produced undesirabe products having in addition to a cloudy appearance a low tensile strength or, as in run 15, an undesirably short shelf life. In runs 11, 12, 13, and 14, cloudy resins were obtained having satisfactory shelf life but undesirably low tensile strength. In run 15, wherein reflux time was continued for 45 minutes, a clear product was obtained, but a shelf life of two to three days and maximum tensile strength of 251 p. s. i. made such a product inferior as a core binder resin.

I have found that the pH of the reaction mixture and the adjusted pH of the product are most important in providing the desired characteristics and properties in the core binder resin. If the unheated reaction mixture comprising the formaldehyde and urea in the appropriate molar ratios is allowed to stand without the addition of the requisite amount of ammonia, the initial pH of the mixture will be too low, thus permitting the reaction to proceed so rapidly that gelling of the mixture will occur. I have found that in preparing the reaction mixture, the mixture should not be allowed to stand too long before refluxing is commenced, and then not without a proper pH adjustment by adding the required amount of ammonia to provide a pH of about 8.9.

In carrying out the vacuum distillation as described in Example 1, for example, reference was made to the fact that when the required amount of distillate had been recovered, the vacuum was released. It is, of course, understood that product recovery is not initiated until the mixture has been refluxed at the reaction temperature for a period of from about 17 to about 19 minutes. I have found that when approximately 25 percent by weight of the total charge has been received as distillate, the product will generally contain from 50–70 percent of the solid urea formaldehyde resin. The distillate recovered includes water produced during the condensation of urea and formaldehyde together with small amounts of unreacted formaldehyde and methanol. The amount of distillate being received during the vacuum distillation can, of course, be calculated by receiving the same in a calibrated receiver or by any other suitable means.

It is also important that the final product have a pH of 7.5 to 8 after treatment with a basic neutralizer. As indicated in the examples, I have found that a dilute solution of sodium pyrophosphate provides an effective neutralizer which has no deleterious effect on the resin product with respect to core binding properties. Other neutralizers such as sodium tripolyphosphate or sodium pyrophosphate decahydrate can be used. In addition, neutralizing agents such as sodium hydroxide, hexamine and magnesium carbonate have been used. However, use of these neutralizing agents lowers the shelf life of the finished product slightly. Since the reaction mixture has a tendency to gel on standing if not stabilized, it has been found necessary to add the stabilizing solution within a short time after distillation has been completed, and preferably immediately thereafter.

The improvement in tensile strength of resins prepared according to my invention will be readily apparent from Table III which follows. Table III is a comparative evaluation of tensile strengths of test cores prepared according to the test method described in Example 1. Briquettes (cores) were prepared from the following formulation: 600 grams lake sand, 60 grams cereal, 60 grams resin, 30 grams kerosene, and 180 grams water. Briquettes of approximately 150 grams each were prepared and baked to a temperature of 350° F. Determinations recorded are the mean average of five briquettes for each timed baking period.

*Table III*

[Tensile strength p. s. i.—at 350° F.]

| Baking Time | Resin A | Resin B | Resin C |
| --- | --- | --- | --- |
| 10 | 183 | 244 | 262 |
| 20 | 188 | 286 | 285 |
| 30 | 197 | 260 | 286 |
| 45 | 184 | 257 | 264 |
| 60 | 169 | 252 | 270 |
| 75 | 165 | 227 | 246 |
| 90 | 154 | 212 | 225 |
| 105 | 135 | 188 | 201 |

Resins A and B are comercially available milky urea formaldehyde core binder resins. Resin C was prepared according to the method of my invention and is the product of run 6 appearing in Table II. All resins were formulated and tested in the same manner and under like conditions. It will be noted that, for the indicated baking time, in all cases, with the exception of the 286 p. s. i. tensile strength of resin B for 20 minutes baking time, resin C had superior tensile strength over both of the commercial resins A and B.

From the foregoing, it is believed that water-clear urea formaldehyde core binder resins prepared according to the method of my invention provide substantially superior tensile strength over those commercially available.

The core binder resin of my invention, in addition to having substantially greater commercial value by reason of its clear appearance, possesses excellent baking time and is easily removable from molds due to the rapid curing to which they can be subjected. The core binder resin of my invention is substantially free of pure formaldehyde, thus minimizing excessive gassing and avoiding the objectionable fish odors that often accompany the baking of similar resins.

Although this invention has been described with reference to particular embodiments thereof, it is, of course, not intended that the invention be limited thereto except insofar as is required by the scope of the appended claims which follow.

I claim:

1. A process for producing a water-clear urea formaldehyde core binder resin of increased tensile strength and shelf life which comprises heat-mixing 1 mol of solid urea with 2.2 mols of 37 percent formaldehyde solution at a pH of between 8.7 and 9.2, said pH being obtained by adding to the urea formaldehyde mixture approximately 0.1 mol of aqueous ammonia solution, heating said reactants to a temperature in the neighborhood of about 200–220° F., maintaining said reactants at the stated temperature during a reflux period of about 17 to 19 minutes, removing from the reaction mixture by vacuum distillation unreacted components of the reaction mixture and water produced during the reaction, said distillation being continued until approximately 25 percent by weight of the original reactant mixture has been obtained as distillate, cooling said reaction mixture after distillation to substantially atmospheric temperature and stabilizing said reaction product within a short time and before gellation occurs thereafter to a pH of between 7.5 and 8 with a solution of stabilizer selected from the group consisting of sodium pyrophosphate sodium pyrophosphate decahydrate and sodium tripolyphosphate.

2. A process for producing a water-clear urea formaldehyde core binder resin of increased tensile strength and shelf life as claimed in claim 1, wherein the stabilizing solution is sodium pyrophosphate.

3. A process for producing a water-clear urea formaldehyde core binder resin of increased tensile strength and shelf life as claimed in claim 1, wherein the stabilizing solution is sodium tripolyphosphate.

4. A process for producing a water-clear urea formaldehyde core binder resin of increased tensile strength and shelf life as claimed in claim 1, wherein the stabilizing solution is sodium pyrophosphate decahydrate.

References Cited in the file of this patent

UNITED STATES PATENTS

| Re. 22,828 | Miller | Jan. 14, 1946 |
| 2,056,453 | Howald | Oct. 6, 1936 |
| 2,587,477 | Hunter | Feb. 26, 1952 |
| 2,634,246 | Gronich | Apr. 7, 1953 |